(12) United States Patent
Okeya et al.

(10) Patent No.: US 7,308,096 B2
(45) Date of Patent: Dec. 11, 2007

(54) ELLIPTIC SCALAR MULTIPLICATION SYSTEM

(75) Inventors: Katsuyuki Okeya, Yokohama (JP); Shinichiro Harano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 783 days.

(21) Appl. No.: 10/196,508

(22) Filed: Jul. 17, 2002

(65) Prior Publication Data
US 2003/0059042 A1 Mar. 27, 2003

Related U.S. Application Data

(63) Continuation-in-part of application No. 09/811,459, filed on Mar. 20, 2001.

(30) Foreign Application Priority Data

May 30, 2000 (JP) .............................. 2000-160001
Sep. 20, 2001 (JP) .............................. 2001-286116

(51) Int. Cl.
*H04L 9/00* (2006.01)
*H04K 1/00* (2006.01)

(52) U.S. Cl. ........................................ 380/28; 713/176

(58) Field of Classification Search .................... None
See application file for complete search history.

(56) References Cited

U.S. PATENT DOCUMENTS

| 5,627,893 | A | * | 5/1997 | Demytko ...................... 380/30 |
| 6,088,798 | A | * | 7/2000 | Shimbo ....................... 713/176 |
| 6,141,420 | A | * | 10/2000 | Vanstone et al. ............. 380/30 |
| 6,611,597 | B1 | * | 8/2003 | Futa et al. .................... 380/30 |
| 6,618,483 | B1 | * | 9/2003 | Vanstone et al. ............. 380/30 |
| 6,782,100 | B1 | * | 8/2004 | Vanstone et al. ............. 380/28 |
| 6,873,706 | B1 | * | 3/2005 | Miyazaki et al. ............. 380/30 |
| 2003/0152218 | A1 | * | 8/2003 | Coron et al. .................. 380/30 |
| 2006/0280296 | A1 | * | 12/2006 | Vasyltsov et al. ............. 380/28 |
| 2007/0121933 | A1 | * | 5/2007 | Futa et al. .................... 380/1 |

OTHER PUBLICATIONS

K. Okeya et al., Power Analysis Breaks Elliptic Curve Cryptosystems even Secure against the Timing Attack, Progress in Cryptology—INDOCRYPT 2000, LNCS 1977, Springer-Verlag, 1999, pp. 178-190. Dec. 2000.

J. Coron, Resistance against Differential power Analysis for Elliptic Curve Cryptosystems, Proc. Of CHES'99, LNCS 1717, Springer-Verlag, 1999, pp. 292-302.

K. Okeya et al., Efficient Elliptic Curve Cryptosystems from a Scalar Multiplication Algorithm with Recovery of the y-Coordinate on a Montgomery-Form Elliptic Curve, Cryptographic Hardware and Embedded Systems, Proc. Of CHES 2001, May 2001, pp. 129-144.

D.V. Vayley et al., Optimal Extension Fields for Fast Arthimetic in Public-Key Algorithms, Advances in Cryptology CRYPTO'98, LNCS1462, 1998, pp. 472-485.

U.S. Appl. No. 09/811,459, filed on Mar. 20, 2001.

Menezes, A., "Elliptic Curve Public Key Cryptosystems", 1993, pp. 21-22.

* cited by examiner

*Primary Examiner*—Christopher Revak
(74) *Attorney, Agent, or Firm*—Mattingly, Stanger, Malur & Brundidge, P.C.

(57) ABSTRACT

In scalar multiplication method in which a point on an elliptic curve is randomized, but yet scalar multiplication can be calculated by the computational cost as much as that without randomization, an operation is carried out upon a point randomized and a point not randomized in a scalar multiplication method to calculate a scalar-multiplied point from a scalar value and a point on an elliptic curve. The result of the operation is randomized while the computational cost becomes as much as that without randomization.

21 Claims, 7 Drawing Sheets

ELLIPTIC SCALAR MULTIPLICATION SYSTEM

CROSS-REFERENCE TO RELATED APPLICATIONS

This application is a continuation-in-part of patent application Ser. No. 09/811,459, entitled METHOD OF CALCULATING MULTIPLICATION BY SCALARS ON AN ELLIPTIC CURVE AND APPARATUS USING SAME AND RECORDING MEDIUM and filed on Mar. 20, 2001 by K. Okeya, the disclosure of which is incorporated herein by reference.

BACKGROUND OF THE INVENTION

The present invention relates to security technology, and particularly relates to a message processing method using an operation on an elliptic curve.

Elliptic curve cryptosystems belong to a kind of public key cryptosystem proposed by N. Koblitz and V. S. Miller. The public key cryptosystem includes information called a public key, which may be made generally open to the public, and secret information called a private key, which must be kept concealed. The public key is used for encryption or signature verification of a given message, and the private key is used for decryption or signature generation of the given message.

The private key in the elliptic curve cryptosystem is carried by a scalar value. In addition, the security of the elliptic curve cryptosystem results from difficulty in solving an elliptic curve discrete logarithm problem. The elliptic curve discrete logarithm problem means a problem of obtaining a scalar value d when there are provided a point P which is on an elliptic curve and a point dP which is a scalar multiple of the point P.

Any point on the elliptic curve designates a set of numbers satisfying a defining equation of the elliptic curve. An operation using a virtual point called the point at infinity as an identity element, that is, addition on the elliptic curve is defined all over the points on the elliptic curve. Then, addition of a point to the point itself on the elliptic curve is particularly called doubling on the elliptic curve.

Addition of two points on an elliptic curve is calculated as follows. When a straight line is drawn through the two points, the straight line intersects the elliptic curve at a third point. The point symmetric to this third intersecting point with respect to the x-axis is defined as a point resulting from the addition. For example, in the case of a Montgomery-form elliptic curve, the addition of a point $(x_1, y_1)$ and a point $(x_2, Y_2)$, that is, $$(x_3, y_3) = (x_1, y_1) + (x_2, y_2)$$

is calculated and obtained by:

$$x_3 = B((y_2-y_1)/(x_2-x_1))^2 - A - x_1 - x_2 \quad \text{(Equation 1)}$$

$$y_3 = ((y_2-y_1)/(x_2-x_1))(x_1-x_3) - y_1 \quad \text{(Equation 2)}$$

Here, A and B designates coefficients of the following defining equation of the Montgomery-form elliptic curve.

$$By^2 = x^3 + Ax^2 + x \quad \text{(Equation 3)}$$

Doubling a point on an elliptic curve is calculated as follows. When a tangent line is drawn at a point on an elliptic curve, the tangent line intersects the elliptic curve at another point. The point symmetric to this intersecting point with respect to the x-axis is defined as a point resulting from the doubling. Performing addition on a certain point a specific number of times is called scalar multiplication. The result of the scalar multiplication is called a scalar-multiplied point, and the number of times is called a scalar value.

The difficulty in solving the elliptic curve discrete logarithm problem has been established theoretically while information (computation time, power consumption and the like) involved in secret information such as a private key may leak out in the processing of encryption in real mounting. Thus, there has been proposed an attack method called side channel attack in which the secret information is recovered on the basis of the leak information.

Side channel attack on elliptic curve cryptosystems is disclosed in:

Document 1: J. Coron, Resistance against Differential Power Analysis for Elliptic Curve Cryptosystems, Cryptographic Hardware and Embedded Systems: Proceedings of CHES '99, LNCS 1717, Springer-Verlag, (1999) pp. 292-302.

In the elliptic curve cryptosystems, encryption, decryption, signature generation or signature verification of a given message have to be carried out with an elliptic curve operation. Particularly, calculation of scalar multiplication on an elliptic curve is used in cryptographic processing using a scalar value as secret information.

A countermeasure against side channel attack on elliptic curve cryptosystems is disclosed in:

Document 2: K. Okeya and K. Sakurai, Power Analysis Breaks Elliptic Curve Cryptosystems even Secure Against the Timing Attack, Progress in Cryptology—INDOCRYPT 2000, LNCS 1977, Springer-Verlag, (2000), pp. 178-190.

There is proposed a method using a Montgomery-form elliptic curve and randomizing points on the given elliptic curve in scalar multiplication on the elliptic curve to thereby safeguard against side channel attack.

With the development of information communication networks, cryptographic techniques have been indispensable elements for concealment or authentication about electronic information. Speeding up is demanded along with the security of the cryptographic techniques. The elliptic curve discrete logarithm problem is so difficult that elliptic curve cryptosystems can make key length shorter than that in RSA (Rivest-Shamir-Adleman) cryptosystems basing their security on the difficulty of factorization into prime factors. Thus, the elliptic curve cryptosystems open the way to comparatively high-speed cryptographic processing. However, the processing speed is not always high enough to satisfy smart cards which have restricted throughput or servers which have to carry out large volumes of cryptographic processing. It is therefore demanded to further speed up the processing in cryptosystems.

Indeed the aforementioned technique is effective as a countermeasure against side channel attack, but there is no consideration for further speeding up the processing.

SUMMARY OF THE INVENTION

It is an object of the present invention to provide an elliptic curve operation method which can safeguard against side channel attack and which is high in speed.

It is another object of the present invention to provide an encryption processing method, a decryption processing method, a signature generation method and a signature verification method using the elliptic curve operation method.

The present invention provides a scalar multiplication method for calculating a scalar-multiplied point from a scalar value and a point on an elliptic curve in the operation on the elliptic curve. The method includes the step of randomizing the point on the elliptic curve, and the step of obtaining the scalar-multiplied point of the point on the elliptic curve by the operation of a value derived from the randomized point and a value derived from the point on the elliptic curve without randomization.

The method according to the present invention may include the step of carrying out an operation upon each bit of the scalar value.

Further, according to the invention, the step of carrying out the operation upon each bit may be executed a predetermined number of times independent of the bit length of the scalar value.

DETAILED DESCRIPTION OF EMBODIMENTS

Embodiments of the present invention will be described below with reference to the drawings.

Figure 1:
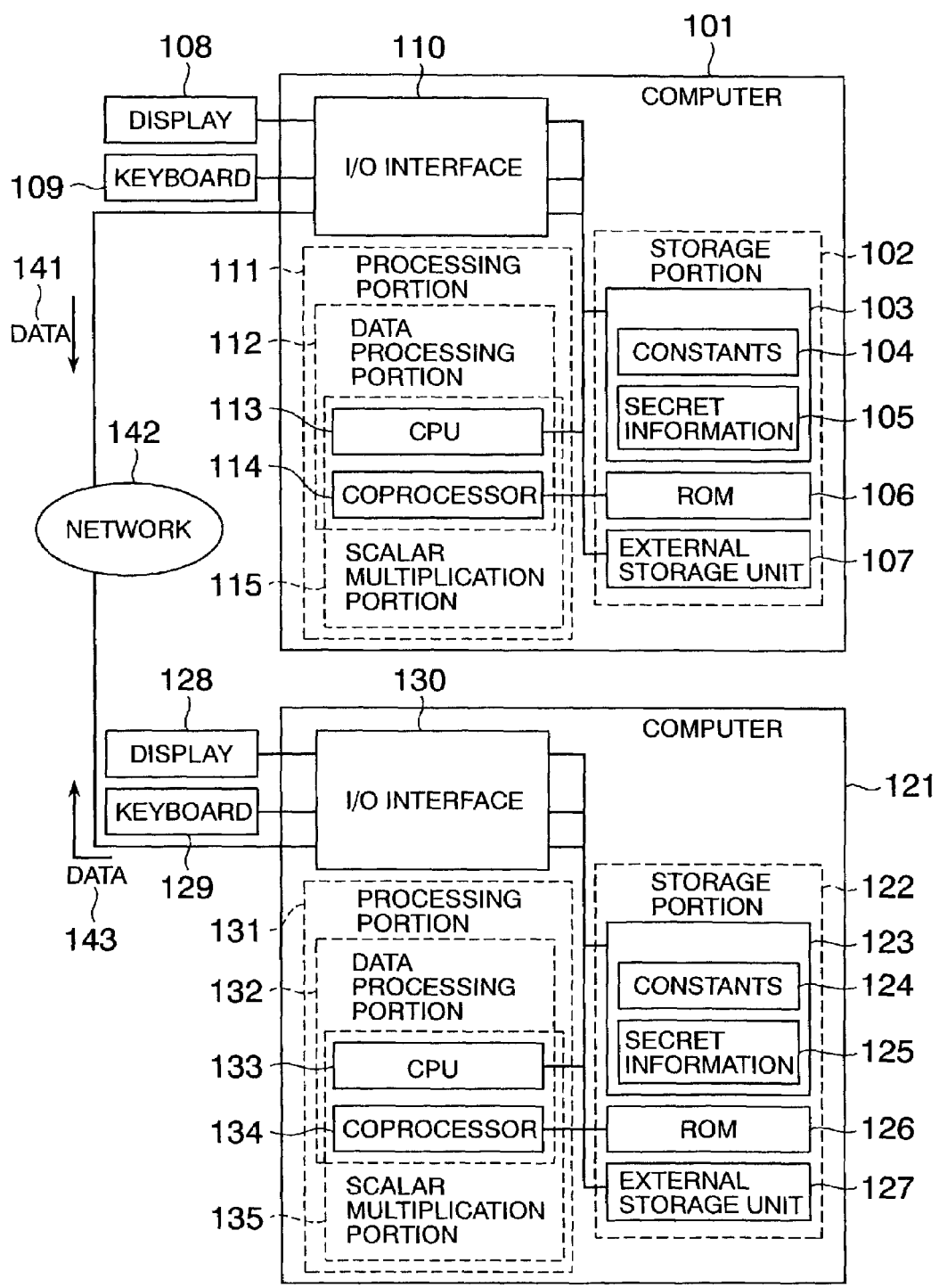
FIG. 1 is a system configuration diagram in an embodiment.

FIG. 1 shows the configuration of a system which is connected through a network 142 and to which an elliptic curve operation method according to the present invention has been applied. In the system, a computer 101 and a computer 121 are connected through the network 142.

To encrypt a message with a public key in the computer 101 in the cryptographic communication system in FIG. 1, $P_m+k(aQ)$ and kQ are calculated and outputted.

To decrypt a cryptogram in the computer 121, it will go well if $-a(kQ)$ is calculated from the private key a and kQ, and $$(P_m+k\,(aQ))-a(kQ) \qquad \text{(Equation 4)}$$

is calculated and outputted. Here, $P_m$ designates the message, k designates a random number, a designates a constant expressing the private key, Q designates an arbitrary base point, and aQ designates a point expressing the public key.

Only $P_m+k(aQ)$ and kQ are transmitted to the network 142. To recover the message $P_m$, it is necessary to calculate kaQ, that is, a-time multiplication of kQ. However, since the private key a is not transmitted to the network 142, only those who hold the private key a can recover the message $P_m$.

In FIG. 1, the computer 101 is equipped with operating units such as a CPU 113 and a coprocessor 114, storage units such as an RAM 103, an ROM 106, and an external storage unit 107, and an I/O interface 110 for carrying out data input/output with the outside of the computer. Exteriorly, there are connected a display 108, a keyboard 109, a read/write unit for portable storage media, and so on, required for a user to operate the computer 101.

Further, the computer 101 implements a storage portion 102 with the storage units such as the RAM 103, the ROM 106, and the external storage unit 107. The operating units such as the CPU 113 and the coprocessor 114 execute programs stored in the storage portion 102 so as to implement a data processing portion 112 and a scalar multiplication portion 115.

In this embodiment, the data processing portion 112 has a function as an encryption processing portion 112, encrypting an input message.

The scalar multiplication portion 115 calculates parameters required for the encryption carried out by the encryption processing portion 112. The storage portion 102 stores constants 104 (for example, a defining equation of an elliptic curve and a base point on the elliptic curve) and secret information 105 (for example, a private key), and so on.

The computer 121 has a hardware configuration similar to that of the computer 101.

Further, the computer 121 implements a storage portion 122 with storage units such as an RAM 123, an ROM 126, and an external storage unit 127. Operating units such as a CPU 133 and a coprocessor 134 execute programs stored in the storage portion 122 so as to implement a data processing portion 132 and a scalar multiplication portion 135.

In this embodiment, the data processing portion 132 has a function as a decryption processing portion 132, decrypting a cryptogram 141 which is an encrypted message.

The scalar multiplication portion 135 calculates parameters required for the decryption carried out by the decryption processing portion 132. The storage portion 122 stores constants 124 (for example, a defining equation of an elliptic curve and a base point on the elliptic curve) and secret information 125 (for example, a private key), and so on.

Figure 2:
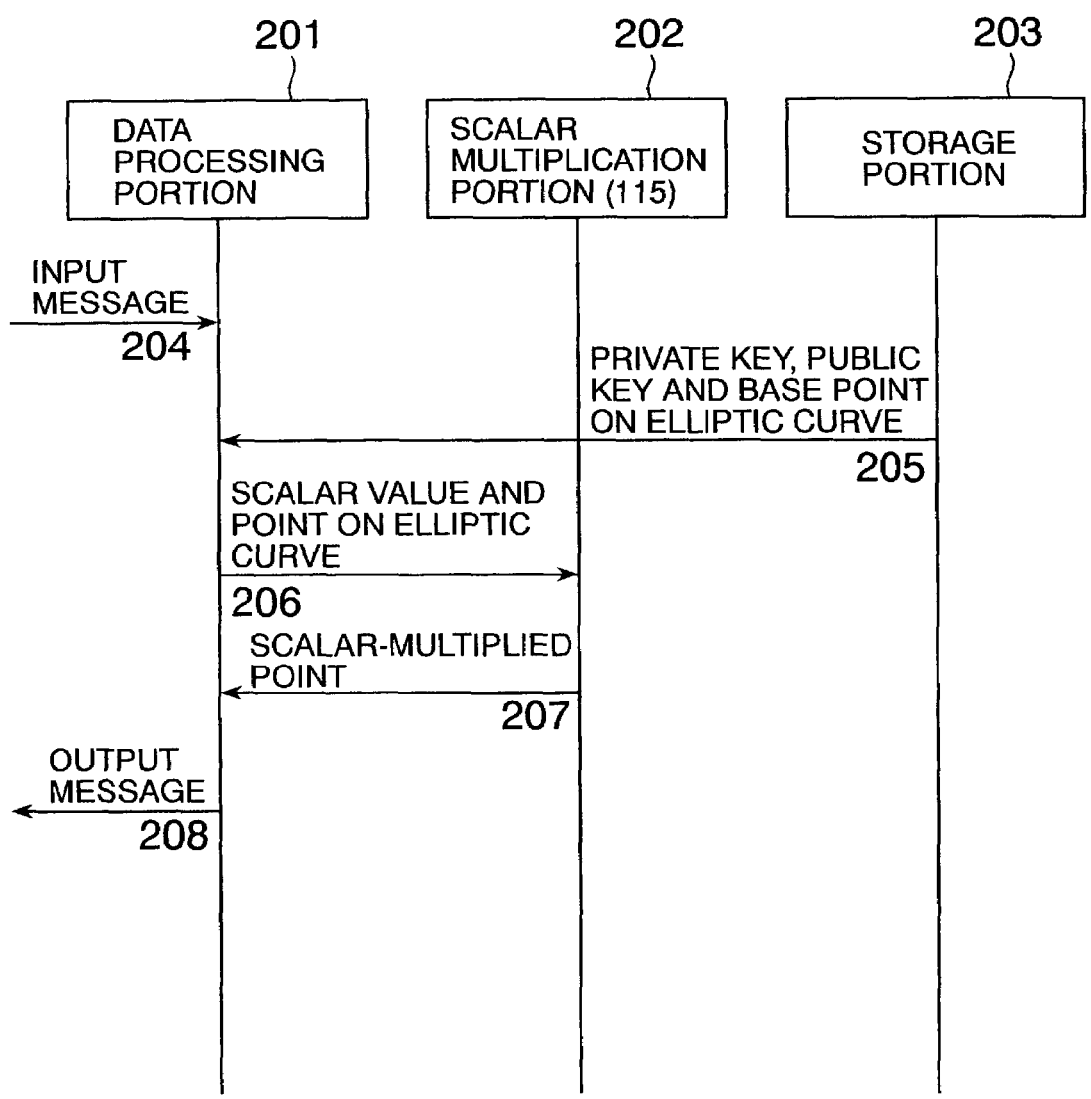
FIG. 2 is a sequence diagram showing delivery of information in respective embodiments.

FIG. 2 shows the state of information delivery carried out by the respective processing portions in the computers 101 and 121.

First, description will be made on the operation in the case where the computer 101 in FIG. 1 encrypts an input message. The kind of message is no object if it is digitized data, such as text data, image data, graphic data, and audio data.

Receiving a plain message (204 in FIG. 2) through the I/O interface 110, the encryption processing portion 112 (201 in FIG. 2) judges whether the bit length of the received plane message is equal to a predetermined bit length or not. When the bit length of the plane message is longer than the predetermined length, the plane message is divided correspondingly to the predetermined bit length. Description will be made below on a partial message (also referred to as "message" simply) divided in the predetermined bit length.

Next, the encryption processing portion 112 calculates a value $(y_1)$ of the y-coordinate of a point $P_m$ located on an elliptic curve and having a numeric value expressed by the bit sequence of the message in an x-coordinate $(x_1)$.

For example, a Montgomery-form elliptic curve is expressed by:

$$B(y_1)^2 = (x_1)^3 + A(x_1)^2 + x_1 \qquad \text{(Equation 5)}$$

wherein B and A are constants respectively. Accordingly, the value of the y-coordinate can be obtained therefrom.

Next, the encryption processing portion 112 generates a random number k. Then, the encryption processing portion 112 sends (206 in FIG. 2) the scalar multiplication portion 115 (202 in FIG. 2) the obtained value of the y-coordinate and the random number k together with the public key aQ and the x-coordinate of a point Q read (205 in FIG. 2) from the constants 104 stored in the storage portion 122 (203 in FIG. 2).

The scalar multiplication portion 115 calculates a scalar-multiplied point $(x_{d1}, y_{d1})=kQ$ from the values of the x-coordinate and the y-coordinate of the point Q, and the random number k, and calculates a scalar-multiplied point $(x_{d2}, y_{d2})=k(aQ)$ from the values of the x-coordinate and the y-coordinate of the public key aQ, and the random number k. The scalar multiplication portion 115 sends (207 in FIG. 2) these calculated scalar-multiplied points to the encryption processing portion 112.

The encryption processing portion 112 carries out encryption processing using the scalar-multiplied points sent thereto. For example, for the Montgomery-form elliptic curve, $P_m+k(aQ)$ and $kQ$ are calculated. That is, an encrypted message $x_{e1}$, $xe_{e2}$ is obtained by the calculation of:

$$x_{e1}=B((y_{d1}-y_1)/(x_{d1}-x_1))^2-A-x_1-x_{d1}, \quad \text{(Equation 6)}$$

$$x_{e2}=x_{d2} \quad \text{(Equation 7)}$$

The computer 101 composes (208 in FIG. 2) an encrypted output message out of at least one partial message encrypted in the encryption processing portion 112.

The computer 101 outputs the encrypted output message as data 141 through the I/O interface 110, and transfers the data 141 to the computer 121 through the network 142.

Incidentally, reading information from the storage portion 203 in FIG. 2 may be performed before the acceptance of the input message.

Next, description will be made on the operation when the computer 121 decrypts the encrypted message 141, with reference to FIG. 2.

Supplied with the encrypted data 141 (input message 204 in FIG. 2) through the I/O interface 110, the decryption processing portion 132 (data processing portion 201 in FIG. 2) judges whether the bit length of the supplied encrypted data 141 is equal to a predetermined bit length or not. When the bit length of the data 141 is longer than the predetermined length, the encrypted data is divided correspondingly to the predetermined bit length. Description will be made below on partial data (also referred to as "data" simply) divided in the predetermined bit length.

A value of the y-coordinate of a point located on an elliptic curve and having a numeric value expressed by the bit sequence of the data 141 in the x-coordinate is calculated.

On the assumption that the encrypted message is of a bit sequence of $x_{e1}$, $x_{e2}$, and the curve is a Montgomery-form elliptic curve, the value ($y_{e1}$) of the y-coordinate can be obtained by:

$$B(y_{e1})^2=(x_{e1})^3+A(x_{e1})^2+x_{e1} \quad \text{(Equation 8)}$$

(wherein B and A are constants respectively).

The decryption processing portion 132 reads (205 in FIG. 2) the private key a from the secret information 125 stored in the storage portion 122 (203 in FIG. 2), and sends (206 in FIG. 2) the private key a together with the values ($x_{e1}$, $y_{e1}$) of the x-coordinate and the y-coordinate to the scalar multiplication portion 135 (202 in FIG. 2).

The scalar multiplication portion 135 calculates a scalar-multiplied point ($x_{d3}$, $y_{d3}$)=a($x_{e2}$, $y_{e2}$) from the values of the x-coordinate and the y-coordinate, and the private key a of the secret information 125.

The scalar multiplication portion 135 sends (207 in FIG. 2) the calculated scalar-multiplied point to the decryption processing portion 132. The decryption processing portion 132 carries out decryption processing using the scalar-multiplied point sent thereto.

For example, when the encrypted message is of a bit sequence of $x_{e1}$, $x_{e2}$, and the curve is a Montgomery-form elliptic curve, the decryption processing is attained by the calculation of:

$$(P_m+k(aQ))-a(kQ)=(x_{e1}, y_{e1})-(x_{d3}, y_{d3})$$

That is, $X_{f1}$, corresponding to the partial message $x_1$ which has not yet been encrypted is obtained by the calculation of:

$$x_{f1}=B((y_{e1}+y_{d3})/(x_{e1}-x_{d3}))^2-A-x_{e1}x_{d3} \quad \text{(Equation 9)}$$

The computer 121 composes (208 in FIG. 2) a plane message out of such partial messages decrypted by the decryption processing portion 132. The computer 121 outputs the plane message from the display 108 or the like through the I/O interface 110.

Next, description will be made on the details of the processing of the scalar multiplication portion 135 when the computer 121 performs the decryption processing.

Figure 3:
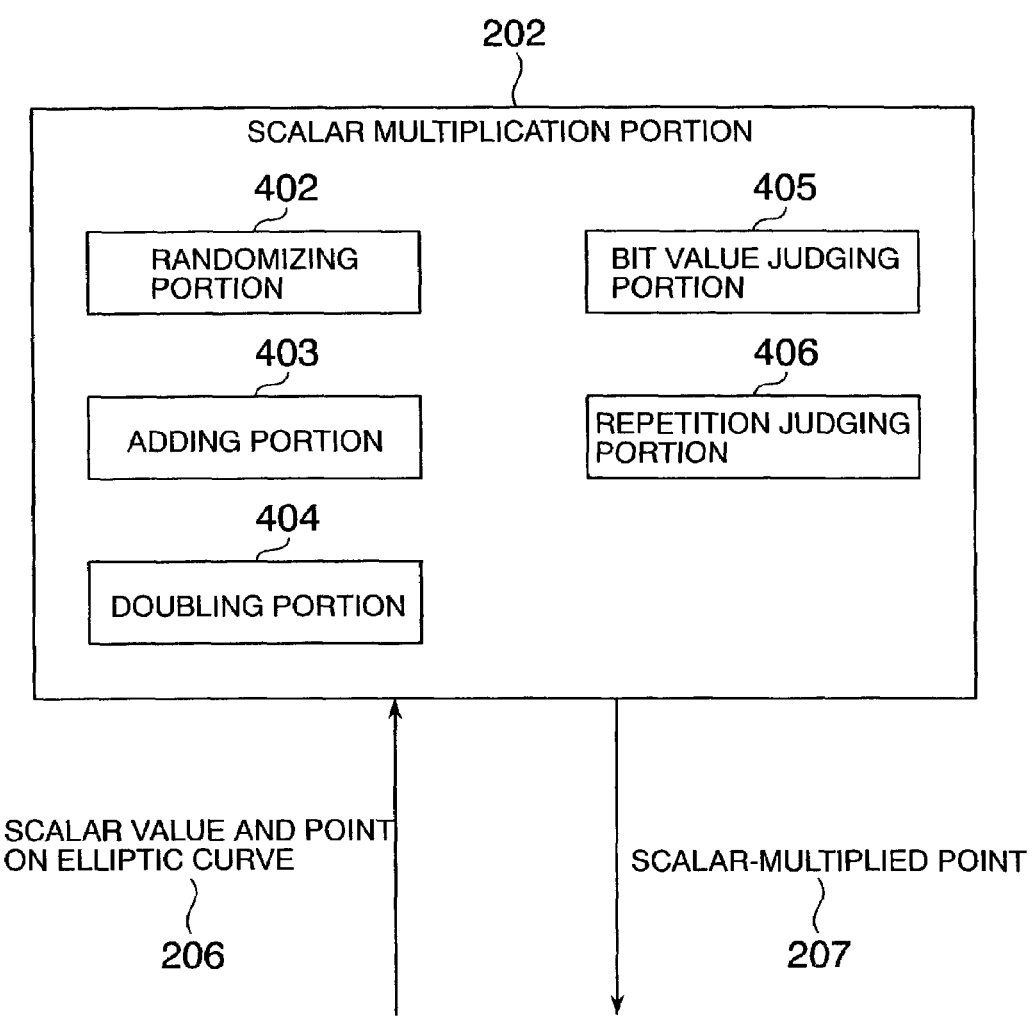
FIG. 3 is a configuration diagram of a scalar multiplication portion in an embodiment.

FIG. 3 shows functional blocks of a scalar multiplication portion used in respective embodiments. The scalar multiplication portion 202 is constituted by a randomizing portion 402, an adding portion 403, a doubling portion 404, a bit value judging portion 405, and a repetition judging portion 406.

Figure 4:
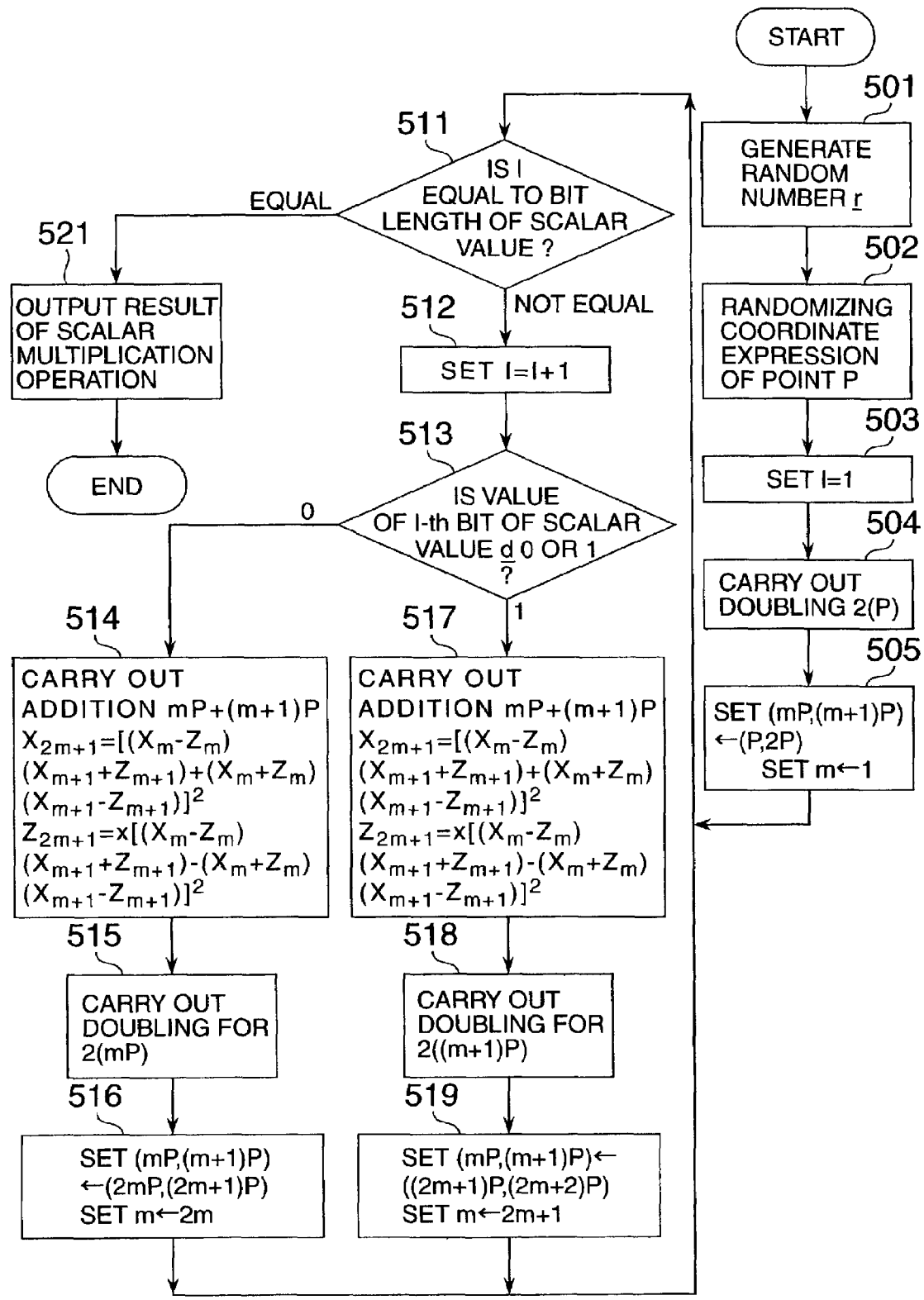
FIG. 4 is a flow chart showing a first scalar multiplication method.

A method (referred to as "first calculation method") in which the scalar multiplication portion 202 calculates a scalar-multiplied point dP on a Montgomery-form elliptic curve from a scalar value d and a point P on the Montgomery-form elliptic curve will be described with reference to FIG. 4. Consider message-related data expressed as a point on the elliptic curve.

When the scalar multiplication portion 202 receives the scalar value d and the point P on the elliptic curve from the decryption processing portion 132, the randomizing portion 402 randomizes the received point P on the elliptic curve. This is attained by the following processing carried out by the randomizing portion 402.

A random number r is generated (501).

The point P=(x, y) is expressed (502) as a randomized point P=(rx, ry, r) in projective coordinates. Here, r≠0.

The initial value 1 is substituted (503) for a variable I.

The doubling portion 404 calculates (504) a doubled point 2P of the randomized point P by use of doubling formulae in the projective coordinates on the Montgomery-form elliptic curve.

The doubling formulae in the projective coordinates on the Montgomery-form elliptic curve include:

$$4X_1Z_1=(X_1+Z_1)^2-(X_1-Z_1)^2 \quad \text{(Equation 10)}$$

$$X_2=(X_1+Z_1)^2(X_1-Z_1)^2 \quad \text{(Equation 11)}$$

$$Z_2=(4X_1Z_1)((X_1-Z_1)^2+((A+2)/4)\,(4X_1Z_1)) \quad \text{(Equation 12)}$$

wherein A designates a constant, $X_1$, $Z_1$, $X_2$ and $Z_2$ designate the X-coordinate and the Z-coordinate of the point P, and the X-coordinate and the Z-coordinate of the point 2P, respectively.

The set of points (P, 2P) made of the randomized point P and the point 2P obtained in Step 504 are stored (505) temporarily as a set of points (mP, (m+1)P) (m is a natural number) at m=1 into the storage portion 122.

The repetition judging portion 406 judges whether the variable I coincides with the bit length of the scalar value d read from the storage portion 122 or not.

When they coincide with each other, the routine of processing goes to Step 521. On the other hand, when they do not coincide with each other, the routine of processing goes to Step 512 (511). When they do not coincide with each other in Step 511, the variable I is increased by 1 (512).

The bit value judging portion 405 judges whether the value of the I-th bit of the scalar value d is 0 or 1. When the value is 0, the routine of processing goes to Step 514. When the value is 1, the routine of processing goes to Step 517 (513).

When the value of the bit is 0 in Step 513, the adding portion 403 carries out addition mP+(m+1)P of the point P and the point (m+1)P from the set of points (mP, (m+1)P) expressed in the projective coordinates by use of the point P=(x, y) which has not been randomized. Thus, the point (2m+1)P is calculated (514).

This is attained by the calculation of:

$$X_{2m+1} = [(X_m - Z_m)(X_{m+1} + Z_{m+1}) + (X_m + Z_m)(X_{m+1} - Z_{m+1})]^2, \quad \text{(Equation 13)}$$

$$Z_{2m+1} = x[(X_m - Z_m)(X_{m+1} + Z_{m+1}) - (X_m + Z_m)(X_{m+1} - Z_{m+1})]^2 \quad \text{(Equation 14)}$$

Here, $X_m$, $Z_m$, $X_{m+1}$, $Z_{m+1}$, $X_{2m+1}$ and $Z_{2m+1}$ designate the X-coordinate and the Z-coordinate of the point mP, the X-coordinate and the Z-coordinate of the point (m+1)P, and the X-coordinate and the Z-coordinate of the point (2m+1)P, respectively.

The doubling portion 404 performs an addition on the elliptic curve, namely doubling 2(mP) of the point mP from the set of points (mP, (m+1)P) expressed in the projective coordinates, so as to calculate the point 2mP (515). This is attained by the calculation of:

$$4X_m Z_m = (X_m + Z_m)^2 - (X_m - Z_m)^2 \quad \text{(Equation 15)}$$

$$X_{2m} = (X_m + Z_m)^2 (X_m - Z_m)^2 \quad \text{(Equation 16)}$$

$$Z_{2m} = (4X_m Z_m)((X_m - Z_m)^2 + ((A+2)/4)(4X_m Z_m)) \quad \text{(Equation 17)}$$

Here, A designates a constant, and $X_m$, $Z_m$, $X_{2m}$ and $Z_{2m}$ designate the X-coordinate and the Z-coordinate of the point mP, and the X-coordinate and the Z-coordinate of the point 2mP, respectively.

The set of points (mP, (m+1)P) is replaced by the set of points (2mP, (2m+1)P) made of the point 2mP obtained in Step 515 and the point (2m+1)P obtained in Step 514, and 2m is substituted for m. Then, the routine of processing returns to Step 511 (516).

When the value of the bit is 1 in Step 513, the adding portion 403 carries out addition mP+(m+1)P of the point mP and the point (m+1)P from the set of points (mP, (m+1)P) expressed in the projective coordinates by use of the point P=(x, y) which has not been randomized. Thus, the point (2m+1)P is calculated (517).

This is attained by the calculation of:

$$X_{2m+1} = [(X_m - Z_m)(X_{m+1} + Z_{m+1}) + (X_m + Z_m)(X_{m+1} Z_{m+1})]^2 \quad \text{(Equation 18)}$$

$$Z_{2m+1} = x[(X_m Z_m)(X_{m+1} + Z_{m+1}) - (X_m + Z_m)(X_{m+1} Z_{m+1})]^2 \quad \text{(Equation 19)}$$

The doubling portion 404 performs an addition on the elliptic curve, namely doubling 2((m+1)P) of the point (m+1)P from the set of points (mP, (m+1)P) expressed in the projective coordinates, so as to calculate the point (2m+2)P (518).

This is attained by the calculation of:

$$4X_{m+1} Z_{m+1} = (X_{m+1} + Z_{m+1})^2 - (X_{m+1} - Z_{m+1})^2 \quad \text{(Equation 20)}$$

$$X_{2m+2} = (X_{m+1} + Z_{m+1})^2 (X_{m+1} Z_{m+1})^2 \quad \text{(Equation 21)}$$

$$Z_{2m+2} = (4X_{m+1} Z_{m+1})((X_{m+1} - Z_{m+1})^2 + ((A+2)/4)(4X_{m+1} Z_{m+1})) \quad \text{(Equation 22)}$$

Here, A designates a constant, and $X_{m+1}$, $Z_{m+1}$, $X_{2m+2}$ and $Z_{2m+2}$ designate the X-coordinate and the Z-coordinate of the point (m+1)P, and the X-coordinate and the Z-coordinate of the point (2m+2)P, respectively.

The set of points (mP, (m+1)P) is replaced by the set of points ((2m+1)P, (2m+2)P) made of the point (2m+1)P obtained in Step 517 and the point (2m+2)P obtained in Step 518, and 2m+1 is substituted for m. Then, the routine of processing returns to Step 511 (519).

When the variable I coincides with the bit length of the scalar value d in Step 511, the values $X_m$ and $Z_m$ are obtained as the X-coordinate and the Z-coordinate of the scalar-multiplied point dP from the point mP=($X_m$, $Y_m$, $Z_m$) expressed in the projective coordinates from the set of points (mP, (m+1)P) expressed in the projective coordinates. The obtained values $X_m$ and $Z_m$ are outputted as the scalar-multiplied point dP to the decryption processing portion 132 (521).

Here, the Y-coordinate may be obtained in an Y-coordinate recovery method, and outputted together, or the coordinates transformed into affine coordinates or the like may be outputted. Alternatively, the coordinates transformed into coordinates on a Weierstrass-form elliptic curve may be outputted.

The Y-coordinate recovery method is disclosed in:

Document 3: K. Okeya and K. Sakurai, Efficient Elliptic Curve Cryptosystems from a Scalar Multiplication Algorithm with Recovery of the y-Coordinate on a Montgomery-Form Elliptic Curve, Cryptographic Hardware and Embedded Systems: Proceedings of CHES 2001, (2001) pp. 129-144.

In the above procedure, the value m and the scalar value d have equal bit length and the same bit pattern. Thus, the values are equal to each other. This means that the calculation of the scalar-multiplied point dP is completed in the above procedure.

Incidentally, although the point on the elliptic curve to be supplied to the scalar multiplication portion 202 is set as a point on a Montgomery-form elliptic curve, it may be a point on a Weierstrass-form elliptic curve. In this case, it will go well if the point on the Weierstrass-form elliptic curve transformed into a point on a Montgomery-form elliptic curve is used.

The computational cost of the operation of addition in the projective coordinates on the Montgomery-form elliptic curve in Step 514 and Step 517 is 3M+2S when the computational cost of multiplication on a finite field is M and the computational cost of squaring on a finite field is S. This computational cost is equal to that when randomization is not carried out on the point P in Step 502.

If the operation of addition is calculated with the randomized point P in Step 514 and Step 517, the computational cost will reach 4M+2S, increasing by M in comparison with that in the aforementioned algorithm using the point P not randomized.

The number of times of repetition of Step 511 to Step 519 is (bit length of scalar value d)−1 times. The total computational cost in the aforementioned algorithm is smaller by (k−1)M than that in the algorithm using the randomized point P in Step 514 and Step 517. Thus, the processing speed is higher so much. Here, k designates the bit length of the scalar value d.

In addition, the aforementioned method is also effective as a countermeasure against side channel attack. This reason is as follows.

The point P randomized in Step 502 is used in the following steps.

In Step 514 and Step 517, the point P not randomized is used. However, in Step 514 and Step 517, the operation for calculating the point (2m+1)P is performed by use of the points mP and (m+1)P derived from the randomized point P, and the point P not randomized. If another value is generated in Step 501 for generating a random number so that the values of the coordinates of the point P randomized in Step 502 are varied, the values of the coordinates of the points mP and (m+1)P will be varied in Step 514 and Step 517. Thus, the values of the coordinates of the point (2m+1)P calculated by use of those values will be varied. That is, even if the same scalar value d and the same point P are provided, the values of the coordinates of the point (2m+1)P will be varied whenever they are calculated.

Further, the same procedure of computations is carried out regardless of the result of judgement about the value of the bit in Step 513. It is therefore proved that there is no dependency relation between the execution sequence of computations and the value of the bit.

When this calculation method is mounted, the same program or processing circuit may be formed to be shared regardless of the bit value, with respect to the processings in Step 513 et seq.

As described above, the first calculation method provides no information useful to side channel attack. Thus, the method is immune to side channel attack. In addition, the method has a feature in that calculation can be performed at a high speed in accordance with the properties of the elliptic curve used therein.

Figure 5:
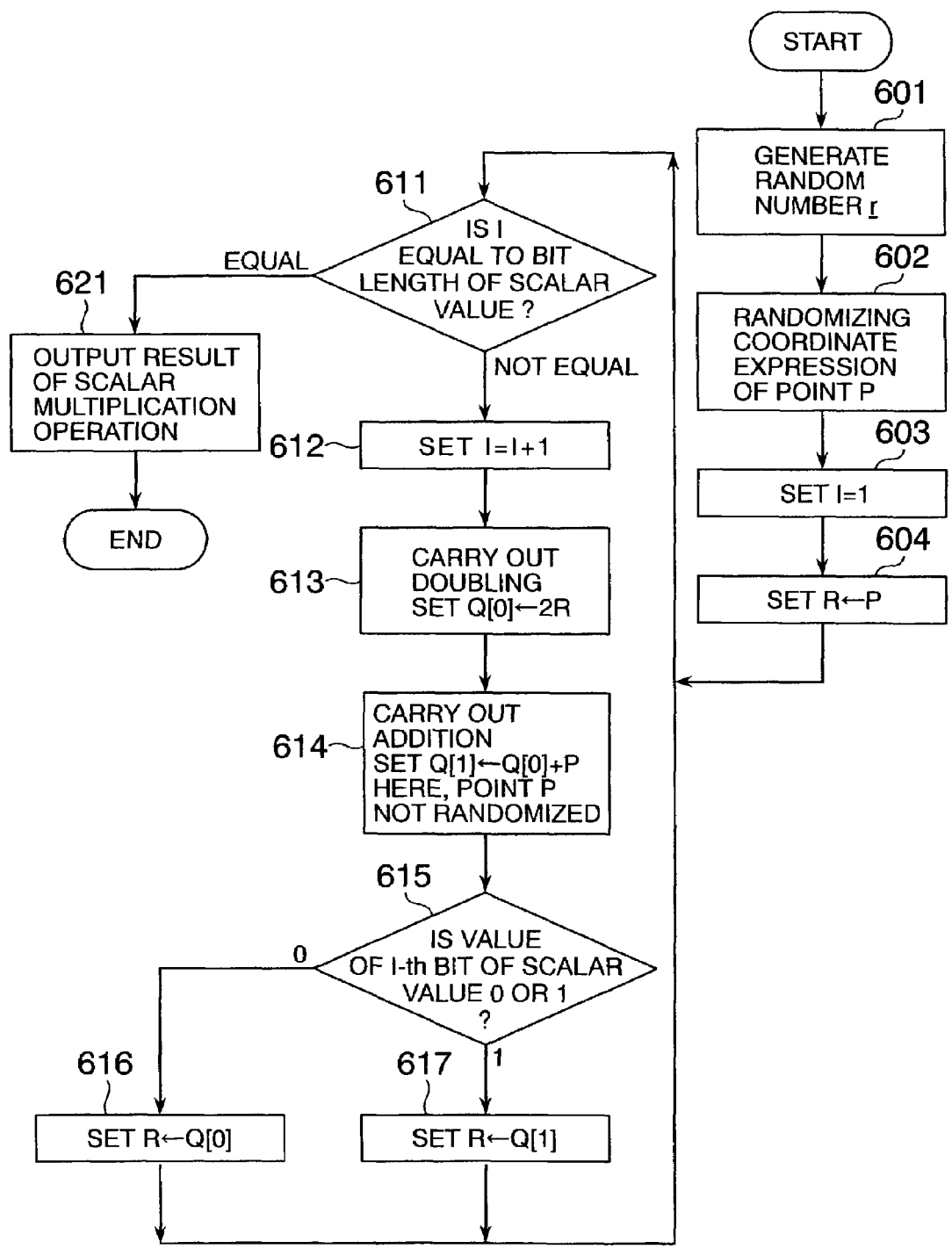
FIG. 5 is a flow chart showing a second scalar multiplication method.

Next, a method (referred to as "second calculation method") in which the scalar multiplication portion 202 calculates a scalar-multiplied point dP on a Weierstrass-form elliptic curve from a scalar value d and a point P on the Weierstrass-form elliptic curve will be described with reference to FIG. 5.

When the scalar multiplication portion 202 receives the point P on the elliptic curve and the scalar value d from the decryption processing portion 132, the randomizing portion 402 randomizes the received point P on the elliptic curve. This is attained by the following processing carried out by the randomizing portion 402.

A random number r is generated (601).

The point P=(x, y) is expressed as $(r^2x, r^3y, r)$ in Jacobian coordinates (602). Here, r, $r^2$ and $r^3 \neq 0$, expressing the degrees of weighting.

Next, the initial value 1 is substituted for a variable I (603).

The point P randomized in Step 602 is stored temporarily as a point R into the storage portion 122 (604).

The repetition judging portion 406 judges whether the variable I coincides with the bit length of the scalar value d or not.

When they coincide with each other, the routine of processing goes to Step 621. On the other hand, when they do not coincide with each other, the routine of processing goes to Step 612 (611).

When they do not coincide with each other in Step 611, the variable I is increased by 1 (612).

The doubling portion 404 carries out doubling 2(R) of the point R expressed in the Jacobian coordinates, and stores the point 2R into Q[0] (613).

The adding portion 403 carries out addition Q[0]+P of the point Q[0] expressed in the Jacobian coordinates, and the point P=(x, y) not randomized, and stores the result of the addition into Q[1] (614).

The bit value judging portion 405 judges whether the value of the I-th bit of the scalar value d is 0 or 1. When the value is 0, the routine of processing goes to Step 616. When the value is 1, the routine of processing goes to Step 617 (615).

When the value of the bit is 0 in Step 615, the point Q[0] obtained in Step 613 is stored as the point R, and the routine of processing returns to Step 611 (616).

When the value of the bit is 1 in Step 615, the point Q[1] obtained in Step 614 is stored as the point R, and the routine of processing returns to Step 611 (617).

When the variable I coincides with the bit length of the scalar value d in Step 611, the point R expressed in the Jacobian coordinates is outputted as the scalar-multiplied point dP to the decryption processing portion 132 (621).

Here, the point transformed into affine coordinates or the like may be outputted. Alternatively, the point transformed into coordinates on a Montgomery-form elliptic curve may be outputted. Incidentally, although the point on the elliptic curve to be supplied to the scalar multiplication portion 202 is set as a point on a Weierstrass-form elliptic curve, it may be a point on a Montgomery-form elliptic curve. In this case, it will go well if the point on the Montgomery-form elliptic curve transformed into a point on a Weierstrass-form elliptic curve is used.

The computational cost of the operation of addition in the Jacobian coordinates on the Weierstrass-form elliptic curve in Step 614 is 8M+3S. This computational cost is equal to that when randomization is not carried out on the point P in Step 602. If the operation of addition is calculated with the randomized point P in Step 614, the computational cost of the operation will reach 12M+4S, increasing by 4M+S in comparison with that in the aforementioned algorithm using the point P not randomized. The number of times of repetition of Step 611 to Step 617 is (bit length of scalar value d)−1 times. The total computational cost in the aforementioned algorithm is smaller by (k−1)(4M+S) than that in the algorithm using the randomized point P in Step 614. Thus, the processing speed is higher so much. Here, k designates the bit length of the scalar value d.

In addition, the aforementioned method is also effective as a countermeasure against side channel attack. This reason is as follows.

The point P randomized in Step 602 is used in the following steps.

In Step 614, the point P not randomized is used. However, the operation Q[0]+P is calculated by use of the point Q[0] derived from the randomized point P, and the point P not randomized. If another value is generated in Step 601 for generating a random number so that the values of the coordinates of the point P randomized therewith in Step 602 are varied, the values of the coordinates of the point Q[0] in Step 614 will be varied, and hence the values of the coordinates of the point Q[0]+P calculated with the varied values will be varied. That is, even if the same scalar value d and the same point P are provided, the values of the coordinates of the point Q[0] will be varied whenever they are calculated.

Further, the same procedure of computations is carried out regardless of the result of judgement on the value of the bit in Step 615. Accordingly, there is no dependency relation between the execution sequence of computations and the value of the bit. Thus, the aforementioned algorithm is immune to side channel attack.

As described above, the aforementioned method provides no information useful to side channel attack. Thus, the method is immune to side channel attack. In addition, the second calculation method has a feature in that it is applicable to elliptic curves used generally, in comparison with the first calculation method.

Incidentally, although the Weierstrass-form elliptic curve is used as the elliptic curve in the second calculation method, an elliptic curve defined on a finite field of characteristics 2 may be used, or an elliptic curve defined on an OEF (Optimal Extension Field) may be used.

There is a statement about OEFs in:

Document 4: D. V. Bailey and C. Paar, Optimal Extension Fields for Fast Arithmetic in Public-key Algorithms, Advances in Cryptology CRYPTO '98, LNCS1462, (1998), pp. 472-485.

Although description has been made above on the operation of the scalar multiplication portion 135 in the case where the computer 121 has decrypted the encrypted data 141, similar things can be applied to the case where the computer 101 encrypts an input message.

In that case, the scalar multiplication portion 115 of the computer 101 outputs the point Q on the elliptic curve, the scalar-multiplied point kQ using the random number k, and the scalar-multiplied point k(aQ) using the public key aQ and the random number k, which have been already described. At this time, the respective scalar-multiplied points can be obtained in similar processings carried out with the random number k substituted for the scalar value d described in the first and second calculation methods, with the point Q on the elliptic curve and the public key aQ substituted for the point P on the elliptic curve described in the first and second calculation methods, and with aQ as the public key.

Figure 7:
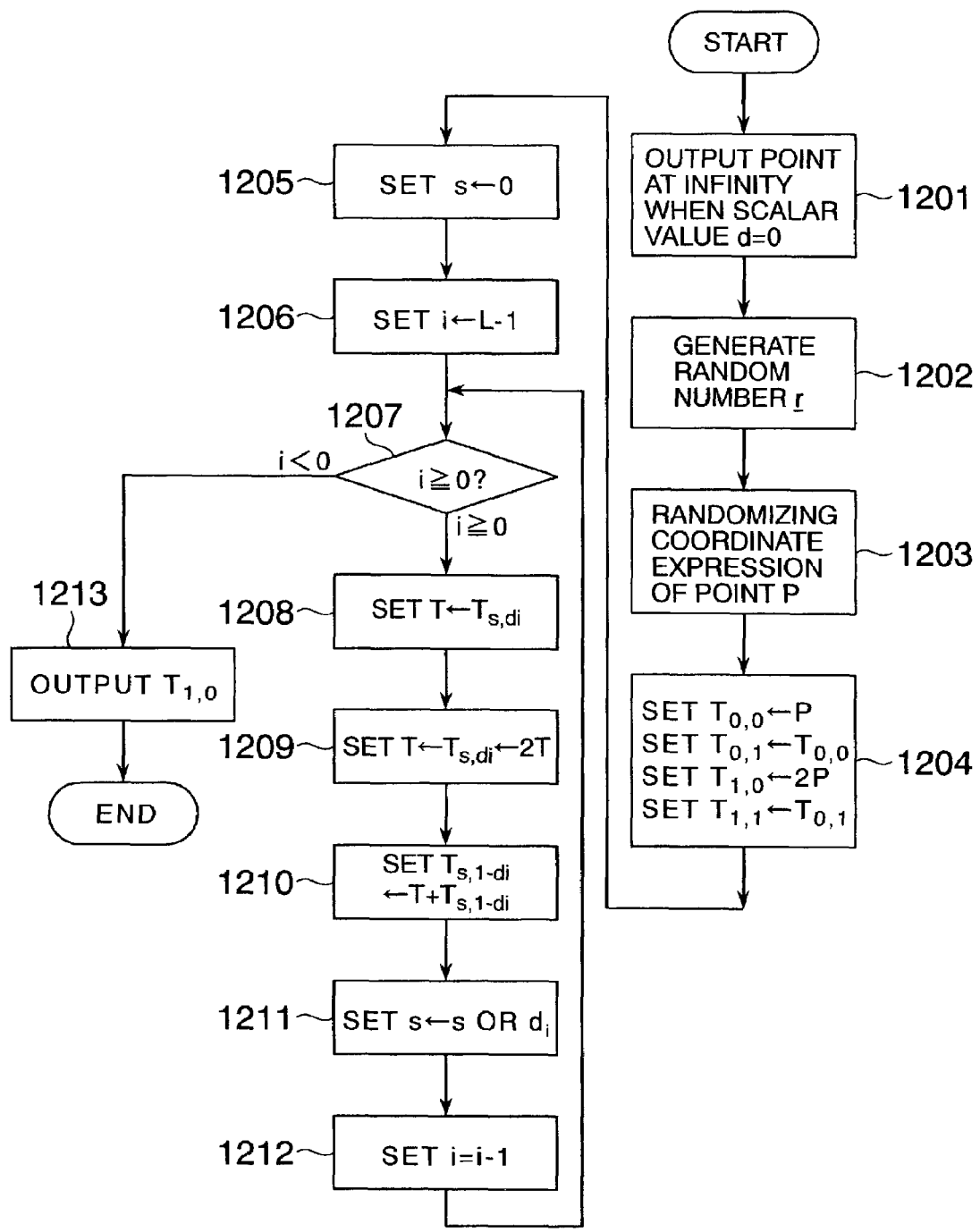
FIG. 7 is a flow chart showing a third scalar multiplication method according to a second embodiment.

Next, a method (referred to as "third calculation method") in which the scalar multiplication portion 202 calculates a scalar-multiplied point dP on a Montgomery-form elliptic curve from a scalar value d of actual bit length L and a point P on the Montgomery-form elliptic curve will be described with reference to FIG. 7. Here, the actual bit length means the number of bits of the area (such as a memory or a register) where the scalar value d is stored. Therefore, the most significant bit does not have to be 1.

This method is designed so that the computation steps and the computation time are fixed regardless of the scalar value d. Accordingly, the method provides no information useful to the aforementioned method of attack. Thus, the method is immune thereto.

Receiving the point P on the elliptic curve and the scalar value d from the decryption processing portion 132, the scalar multiplication portion 202 judges whether the scalar value d is 0 or not. When the scalar value d is 0, the scalar multiplication portion 202 outputs the point at infinity, and then terminates the processing. When the scalar value d is not 0, the scalar multiplication portion 202 keeps on with the processing (1201).

The randomizing portion 402 randomizes the received point P on the elliptic curve. That is:

A random number r is generated (1202).

The point P is expressed as (rx, ry, r) in projective coordinates (1203).

Next, indefinite points $T_{0,0}$, $T_{0,1}$, $T_{1,0}$ and $T_{1,1}$ on the elliptic curve are initialized. The point P randomized in Step 1203, the indefinite point $T_{0,0}$ the doubled point 2P of the point P randomized in Step 1203, and the indefinite point $T_{0,1}$ are substituted for the indefinite points $T_{0,0}$, $T_{0,1}$, $T_{1,0}$ and $T_{1,1}$ respectively. The doubled point 2P of the randomized point P is calculated by use of the doubling formulae (Equations 10, 11 and 12) in the projective coordinates on the Montgomery-form elliptic curve (1204).

The initial value 0 is substituted for a variable s (1205).

The initial value L-1 is substituted for a variable i (1206).

The repetition judging portion 406 judges whether the variable i is smaller than 0 or not. When the variable i is not smaller than 0, the routine of processing goes to Step 1208. When the variable i is smaller than 0, the routine of processing goes to Step 1213 (1207).

A point $T_{s,d1}$ is substituted for an indefinite point T on the elliptic curve. The value $d_1$ corresponds to a bit $d_1$ at j=i on the expression that the scalar value $d=\Sigma d_j 2^j, d_j \in \{0,1\}$, j moves between 0 and L-1 (1208).

The doubling portion 404 carries out doubling 2(T) of the point T expressed in projective coordinates, and stores the obtained point 2T into the point $T_{s,d1}$ (1209).

The adding portion 403 carries out addition of the point T expressed in the projective coordinates and the point $T_{s,1-di}$ expressed in the projective coordinates by use of the point P=(x, y) not randomized, and stores the result of the addition into the point $T_{s,1-di}$ (1210).

Logical sum of s and $d_i$, is performed, and the result of the logical sum is stored into s (1211).

The variable i is decreased by 1 (1212).

When i<0 in Step 1207, the point $T_{1,0}$ expressed in the projective coordinates is outputted as the scalar-multiplied point dP to the decryption processing portion 132 (1213).

Here, the Y-coordinate may be obtained in an Y-coordinate recovery method, and outputted together, or the coordinates transformed into affine coordinates or the like may be outputted. Alternatively, the coordinates transformed into coordinates on a Weierstrass-form elliptic curve may be outputted. There is a statement about the Y-coordinate recovery method in Document 3.

Incidentally, although the point on the elliptic curve to be supplied to the scalar multiplication portion 202 is set as a point on a Montgomery-form elliptic curve, it may be a point on a Weierstrass-form elliptic curve. In this case, it will go well if the point on the Weierstrass-form elliptic curve transformed into a point on a Montgomery-form elliptic curve is used.

The computational cost of the operation of addition in the projective coordinates on the Montgomery-form elliptic curve in Step 1210 is 3M+2S. This computational cost is equal to that when randomization is not carried out on the point P in Step 1203.

If the operation of addition is calculated with the randomized point P in Step 1210, the computational cost of the operation will reach 4M+2S, increasing by M in comparison with that in the aforementioned algorithm using the point P not randomized.

The number of times of repetition of Step 1207 to Step 1212 is L times. The total computational cost in the aforementioned algorithm is smaller by LM than that in the algorithm using the randomized point P in Step 1210. Thus, the processing speed is higher so much.

In addition, the aforementioned third calculation method is also effective as a countermeasure against side channel attack. This reason is as follows.

The point P randomized in Step 1203 is used in the following steps.

In Step 1210, the point P not randomized is used. However, in Step 1210, the point $T+T_{s,1-d1}$ is calculated by use of the points T and $T_{s,1-d1}$ derived from the randomized point P, and the point P not randomized. If another value is generated in Step 1202 for generating a random value so that the values of the coordinates of the point P randomized in Step 1203 are varied, the values of the coordinates of the points T and $T_{s,1-di}$ will be varied in Step 1210. Thus, the values of the coordinates of the point $T+T_{s,1-di}$ calculated by use of those values will be varied. That is, even if the same scalar value d and the same point P are provided, the values of the coordinates of the point $T+T_{s,1-di}$ will be varied whenever they are calculated.

Further, the same procedure of computations is carried out regardless of the value of each bit $d_i$. Accordingly, there is no dependency relation between the execution sequence of computations and the value of the bit.

In addition, the number of times of repetition of the Step 1207 to Step 1212 does not depend on the bit length of the value d, but always takes L times. Thus, the execution sequence of computations does not depend on the bit length of the value d, either.

Incidentally, the bit $d_{L-1}$ may be substituted for s in Step 1205, and L-2 be substituted for I in Step 1206. In this case, there is produced no dummy operation when the most significant bit $d_{L-1}$ of the scalar value d is 1. That is, the initial repetition of Steps 1207-1212 carried out when s=0 and i=L-1 can be omitted so that the algorithm can be further speeded up.

As described above, the third calculation method provides no information useful to side channel attack. Thus, the method is immune to side channel attack.

Next, an embodiment in which the present invention is applied to a signature verification system will be described with reference to FIG. 6 and FIG. 2.

Figure 6:
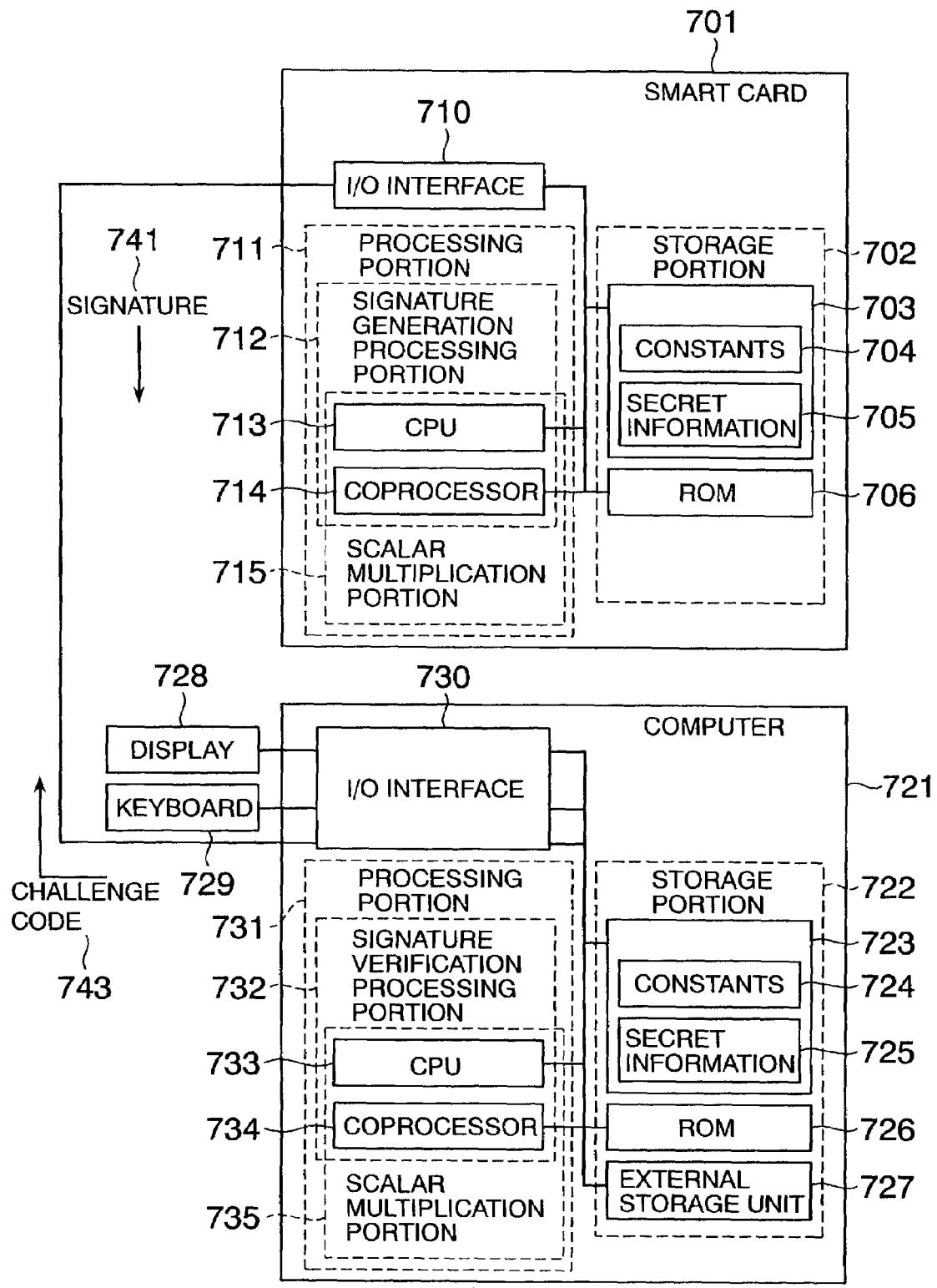
FIG. 6 is a configuration diagram of a signature verification system in an embodiment.

The signature verification system in FIG. 6 is constituted by a smart card 701 and a computer 721 for performing signature verification processing.

In terms of functions, the smart card 701 has a configuration similar to that of the computer 101. Not the encryption processing portion 112 but a signature generation processing portion 712 for providing message data or a signature is implemented with operating units such as a CPU 733 and a coprocessor 734, and programs stored in a storage portion 722. Incidentally, there is not provided any external storage unit, any display, or any keyboard.

The computer 721 has a configuration similar to that of the computer 101, and not the decryption processing portion 132 but a signature verification processing portion 732 is implemented with a CPU 733 and programs.

Scalar multiplication portions 715 and 735 have functions similar to those of the scalar multiplication portions 115 and 135 shown in FIG. 1, respectively.

The operation of signature generation and signature verification in the signature verification system in FIG. 6 will be described with reference to FIG. 2.

The computer 721 transmits a numeric value selected at random as a challenge code 743 to the smart card 701.

The signature generation processing portion 712 (201 in FIG. 2) accepts the challenge code 743, gets the hash value of the challenge code 743, and transforms the hash value into a numeric value f of predetermined bit length.

The signature generation processing portion 712 generates a random number u, and sends (206 in FIG. 2) the random number d to the scalar multiplication portion 715 (202 in FIG. 2) together with a base point Q on the elliptic curve read (205 in FIG. 2) from constants 704 stored in the storage portion 702 (203 in FIG. 2).

The scalar multiplication portion 715 calculates a scalar-multiplied point $(x_u, y_u)$ using the base point Q and the random number u, and sends (207 in FIG. 2) the calculated scalar-multiplied point to the signature generation processing portion 712.

The signature generation processing portion 712 generates a signature by use of the scalar-multiplied point sent thereto. For example, in the case of an ECDSA signature, a signature (s, t) corresponding to the challenge code 743 is obtained (208 in FIG. 2) by the calculation of:

$$s = x_u \bmod q \quad \text{(Equation 23)}$$

$$t = u^{-1} (f + ds) \bmod q \quad \text{(Equation 24)}$$

Here, the value q designates the order of the base point Q, that is, such a numeric value that the q-multiplied point qQ of the base point Q becomes the point at infinity while an m-multiplied point mQ of the base point Q with respect to a numeric value m smaller than the value q is not the point at infinity.

There is a statement about the ECDSA signature in:

Document 5: ANSI X9.62 Public Key Cryptography for the Financial Services Industry, The Elliptic Curve Digital Signature Algorithm (ECDSA), (1999).

The smart card 701 outputs the signature 741 generated in the signature generation processing portion 712 through an I/O interface 710. The signature 741 is transferred to the computer 721.

Receiving (204 in FIG. 2) the signature 741, the signature verification processing portion 732 (201 in FIG. 2) of the computer 721 examines whether the numeric values s and t of the signature 741 are within a suitable range, that is, satisfy $1 \leq s, t < q$.

When the numeric values s and t are not within the aforementioned range, the signature verification processing portion 732 outputs "invalid" as the result of signature verification for the challenge code 743, and rejects the smart card 701. When the numeric values s and t are within the aforementioned range, the signature verification processing portion 732 performs the calculation of:

$$h = t^{31\ 1} \bmod q \quad \text{(Equation 25)}$$

$$h_1 = fh \bmod q \quad \text{(Equation 26)}$$

$$h_2 = sh \bmod q \quad \text{(Equation 27)}$$

Then, the signature verification processing portion 732 sends (206 in FIG. 6) the scalar multiplication portion 735 (202 in FIG. 2) the calculated values $h_1$ and $h_2$ together with a public key aQ and the base point Q read (205 in FIG. 2) from the constants 724 stored in the storage portion 722 (203 in FIG. 2).

The scalar multiplication portion 735 calculates a scalar-multiplied point $h_1 Q$ using the base point Q and the value $h_1$ and a scalar-multiplied point $h_2 aQ$ using the public key aQ and the value $h_2$, and sends (207 in FIG. 2) the calculated scalar-multiplied points to the signature verification processing portion 732.

The signature verification processing portion 732 performs signature verification processing using the scalar-multiplied points sent thereto. For example, a point R is calculated by:

$$R = h_1 Q + h_2 aQ \quad \text{(Equation 28)}$$

When the x-coordinate of the point R is $X_R$, a value s' is calculated by:

$$S' = X_R \bmod q \quad \text{(Equation 29)}$$

When s'=s, the signature verification processing portion 732 outputs "valid" as the result of signature verification for the challenge code 743, authenticates and accepts (208 in FIG. 2) the smart card 701.

When not s'=s, the signature verification processing portion 732 outputs "invalid", and rejects (208 in FIG. 2) the smart card.

The scalar multiplication portion 715 or 735 in the above embodiment has a function similar to that of the scalar multiplication portion 115 or 135 in FIG. 1. Accordingly, scalar multiplication can be performed at high speed while safeguarding against side channel attack.

Accordingly, the smart card 701 engaging in signature generation processing and the computer 721 engaging in signature verification processing can safeguard against side channel attack and further carry out the processing at high speed.

Next, an embodiment in which the present invention is applied to a key exchange system will be described. In this embodiment, the system configuration of FIG. 1 can be applied.

The data processing portions 112 and 132 in FIG. 1 function as key exchange processing portions 112 and 132 in this embodiment, respectively.

The operation in the case where the computer 101 in the key exchange system derives shared information from input data 143 will be described with reference to FIGS. 1 and 2.

The data processing portion 132 (201 in FIG. 2) of the computer 121 reads a secret key b from the constants 124 in the storage portion 122 (203 in FIG. 2), and calculates a public key bQ of the computer 121. Then, the public key bQ is transferred as data 143 to the computer 101 through the network 142.

When the key exchange processing portion 112 (201 in FIG. 2) of the computer 101 accepts (204 in FIG. 2) the input of the public key bQ of the computer 121, the key exchange processing portion 112 sends (206 in FIG. 2) the scalar multiplication portion 115 (202 in FIG. 2) the public key bQ of the computer 121 together with a private key a of the computer 101 which is secret information 105 read (205 in FIG. 2) from the storage portion 102 (203 in FIG. 2).

The scalar multiplication portion 115 calculates a scalar-multiplied point abQ using the private key a and the public key bQ, and sends (207 in FIG. 2) the calculated scalar-multiplied point to the key exchange processing portion 112.

The key exchange processing portion 112 derives shared information by use of the scalar-multiplied point sent thereto, and stores the derived shared information as secret information 105 into the storage portion 102. For example, the x-coordinate of the scalar-multiplied point abQ is set as shared information.

Next, description will be made on the operation when the computer 121 derives the shared information from the input data 141.

The data processing portion 112 (201 in FIG. 2) of the computer 101 reads a secret key a from the constants 104 in the storage portion 102 (203 in FIG. 2), and calculates a public key aQ of the computer 101. Then, the public key aQ is transferred as data 141 to the computer 121 through the network 142.

When the key exchange processing portion 132 (201 in FIG. 2) of the computer 121 accepts (204 in FIG. 2) the input of the public key aQ of the computer 101, the key exchange processing portion 132 sends (206 in FIG. 2) the scalar multiplication portion 135 (202 in FIG. 2) the public key aQ of the computer 101 together with a private key b of the computer 121 which is secret information 125 read (205 in FIG. 2) from the constants 124 in the storage portion 122.

The scalar multiplication portion 135 calculates a scalar-multiplied point baQ using the private key b and the public key aQ, and sends (207 in FIG. 2) the calculated scalar-multiplied point to the key exchange processing portion 132.

The key exchange processing portion 132 derives shared information by use of the scalar-multiplied point sent thereto, and stores the derived shared information as secret information 125 into the storage portion 122. For example, the x-coordinate of the scalar-multiplied point baQ is set as shared information.

Here, since the number ab and the number ba are identical as numeric value, the point abQ and the point baQ indicate the same point, resulting in the derivation of the same information.

Although the point aQ and the point bQ are transmitted onto the network 142, the private key a or the private key b has to be used to calculate the point abQ (or the point baQ). That is, those who do not know the private key a or the private key b cannot obtain the shared information. The shared information obtained thus can be utilized as a private key in a private key cryptosystem.

Also in this embodiment, since the scalar multiplication portions 115 and 135 have the aforementioned features, they can perform key exchange processing at high speed while safeguarding against side channel attack.

In addition, the encryption processing portion, the decryption processing portion, the signature generation portion, the signature verification portion and the key exchange processing portion in the above description may be implemented with special hardware. In addition, the scalar multiplication portion may be implemented with a coprocessor or other special hardware.

In addition, the data processing portion may be designed to be able to perform at least one processing of the encryption processing, the decryption processing, the signature generation processing, the signature verification processing and the key exchange processing described previously.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A scalar multiplication method for calculating data input for encrypting a message in a computer of an information processing system, comprising the steps of operating the computer to perform:
    inputting a scalar value and message-related data expressed as points on an elliptic curve;
    generating a random number;
    randomizing said message-related data expressed as said points on said elliptic curve into first values of points on other coordinates by use of said random number;
    processing said first values derived from said randomized points and said message-related data of said points on said elliptic curve without randomizing of said message-related data and without depending on bit length of the scalar value;
    encrypting said message based on said first values; and
    outputting a result of said processing of said first values.

2. A scalar multiplication method according to claim 1, wherein:
    said second step includes adding said message-related value and said first values on said elliptic curve.

3. A scalar multiplication method according to claim 1, wherein said processing step is repeated in a loop until a bit length of said scalar value for said second step.

4. A scalar multiplication method according to claim 1, further including:
    transforming a coordinate system expressing said message-related data from Affine coordinates to Jacobian coordinates where a point P=(x, y) is expressed as $(r^2x, r^3y, r)$.

5. A scalar multiplication method according to claim 1, further including:
    transforming a coordinate system expressing said message-related data into a coordinate system with coordinates axes having different weights $(r^2x, r^3y, r)$ added thereto.

6. A scalar multiplication method for operating a computer to calculate a scalar-multiplied point from a scalar value and a point on an elliptic curve in an elliptic curve cryptosystem including a randomizing portion and an operating portion, comprising the steps of operating the computer to:
    input a scalar value and message-related data expressed as points on an elliptic curve and to generate a random number thereby to randomize said point on said elliptic curve in said randomizing portion;
    execute an operation upon a value derived from said randomized point and a value derived from said point on said elliptic curve without randomizing said point on said elliptic curve in said operating portion and without depending on bit length of the scalar value;
    encrypt said message based on said first values; and
    output a result of said processing of said first values.

7. A scalar multiplication method according to claim 6, further comprising the steps of operating the computer to:
    judge a value of each bit of said scalar value;
    carry out an operation upon each bit of said scalar value in accordance with a result of said judgement; and
    combine results of said operations;
    wherein said step of operating the computer to carry out an operation upon each bit includes calculating steps independent of said judged value of bits.

8. A scalar multiplication method according to claim 7, wherein:
    said step of operating the computer to carry out an operation upon each bit is executed a predetermined number of times until a bit length of said scalar value equals a predetermined bit length.

9. A scalar multiplication method according to claim 6, wherein:
a Montgomery-form elliptic curve is used as said elliptic curve.

10. A scalar multiplication method according to claim 6, wherein:
a Weierstrass-form elliptic curve is used as said elliptic curve.

11. A scalar multiplication method according to claim 6, wherein:
an elliptic curve defined on a finite field with characteristic 2 is used as said elliptic curve.

12. A scalar multiplication method according to claim 6, wherein:
an elliptic curve defined on an optimal extension field (OEF) is used as said elliptic curve.

13. A scalar multiplication method according to claim 6, wherein said step of operating the computer to execute is repeated in a loop until a bit length of said scalar equals a predetermined bit length.

14. A scalar multiplication method according to claim 6, further comprising the step of operating the computer to:
input into a signature generation portion of said cryptosystem a challenge code and get a hash value thereof to generate in said operating portion a signature by use of the scalar-multiplied point; and
send out data of the signature from said operating portion.

15. A scalar multiplication method according to claim 6, further comprising the step of operating the computer to:
generate decrypted data by operating encrypted data and said value executed with said operation.

16. A scalar multiplication system for calculating a scalar-multiplied point from a scalar value and a point on an elliptic curve in an elliptic curve cryptosystem, wherein the system includes a computer, the system comprising:
means for inputting a scalar value and message-related data expressed as points on an elliptic curve;
means for generating a random number;
a randomizing portion operative in the computer for randomizing said point on said elliptic curve into first values of points on other coordinates by use of said random number;
an operating portion operative in the computer for executing an operation upon first values derived from said randomized point and a second value derived from said point on said elliptic curve without randomization, so as to calculate said scalar-multiplied point and without depending on bit length of the scalar value;
means for encrypting said message based on said first values; and
means for outputting a result of said processing of said first values.

17. A signature generation system comprising:
a computer;
an operating portion;
a signature portion for generating signature data from message data;
a scalar multiplication portion for calculating a scalar-multiplied point in response to a request from said signature portion; and
a scalar multiplication means operative on the computer for:
generating a random number and randomizing, by use of said random number, data of said point obtained in said system on said elliptic curve in said operating portion;
executing an operation upon a value derived from said randomized point and a value derived from said point on said elliptic curve without randomizing said point on said elliptic curve in said operating portion; and
processing and outputting said message data with a predetermined private key to generate the signature data.

18. A decryption system including a computer, the system comprising:
a decryption portion operative on the computer for generating decrypted data from encrypted data; and
a scalar multiplication portion operative on the computer for calculating a scalar-multiplied point in response to a request from said decryption portion; and
a scalar multiplication means operative on the computer for:
inputting a scalar value and said decrypted data expressed as points on an elliptic curve;
generating a random number;
randomizing said decrypted data, by use of said random number, into first values of points on another elliptic curve;
processing said first values derived from said randomized points and said decrypted data of said points on said elliptic curve without depending on bit length of the scalar value,
wherein said encrypted data and the scalar-multiplied point are processed to obtain and send out the decrypted data.

19. A computer-readable storage medium tangibly-embodying computer-readable codes for programs to run on an elliptic curve cryptosystem including a randomizing portion and an operating portion, wherein the codes are executable by a computer to perform the steps of:
inputting a scalar value and message-related data expressed as points on an elliptic curve, generating a random number, and thereby randomizing a point on an elliptic curve in said randomizing portion;
executing an operation upon first values derived from said randomized point and a second value derived from said point on said elliptic curve without randomizing said point on said elliptic curve in said operating portion and without depending on bit length of the scalar value;
encrypting said message based on said first values; and
outputting a result of said processing of said first values.

20. A computer-readable storage medium according to claim 19, further tangibly-embodying codes for repeating said step of executing an operation until a bit length of a scalar value equals a predetermined bit length.

21. A computer-readable storage medium tangibly-embodying computer-readable codes for programs concerned with a signature generation to run on an elliptic curve cryptosystem including a randomizing portion and an operating portion, wherein the codes are executable by a computer to perform the steps of:
inputting a scalar value and message-related data expressed as points on an elliptic curve, generating a random number, and thereby randomizing a point on an elliptic curve in said randomizing portion; and
executing an operation upon first values derived from said randomized point and a second value derived from said point on said elliptic curve without randomizing said point on said elliptic curve and without depending on bit length of the scalar value;
encrypting said message based on said first values; and
outputting a result of said processing of said first values, wherein an elliptic curve defined on an optimal extension field (OEF) is used as said elliptic curve in said operating portion.

* * * * *